(12) United States Patent  (10) Patent No.: US 8,215,361 B2
Baughman  (45) Date of Patent: Jul. 10, 2012

(54) TIRE SIDEWALL STITCHER

(76) Inventor: Gilbert L. Baughman, Findlay, OH (US)

( * ) Notice: Subject to any disclaimer, the term of this patent is extended or adjusted under 35 U.S.C. 154(b) by 404 days.

(21) Appl. No.: 12/290,942

(22) Filed: Nov. 5, 2008

(65) Prior Publication Data

US 2010/0108266 A1    May 6, 2010

(51) Int. Cl.
*B29D 30/14* (2006.01)
(52) U.S. Cl. .......................... 156/421; 492/13
(58) Field of Classification Search ............. 156/130.3, 156/134, 411, 421, 123, 130, 304.1, 408, 156/502, 503, 579, 581, 582; 492/13, 19, 492/16, 30
See application file for complete search history.

(56) References Cited

U.S. PATENT DOCUMENTS

| 1,465,177 | A | * | 8/1923 | Richter | 156/394.1 |
|---|---|---|---|---|---|
| 1,544,601 | A | * | 7/1925 | Schade | 12/103 |
| 3,641,643 | A | * | 2/1972 | Niemi | 156/579 |
| 3,705,994 | A | * | 12/1972 | Berry | 310/91 |
| 3,909,341 | A | | 9/1975 | Moscovita | |
| 4,148,205 | A | * | 4/1979 | Boysen | 72/176 |
| 4,341,042 | A | * | 7/1982 | Schulz | 49/404 |
| 4,454,000 | A | | 6/1984 | Schlemmer | |
| 4,478,672 | A | | 10/1984 | Precht | |
| 4,548,016 | A | * | 10/1985 | Dubich et al. | 52/749.12 |
| D290,214 | S | * | 6/1987 | Nellis | D7/697 |
| 5,393,289 | A | * | 2/1995 | Green | 492/13 |
| 5,641,025 | A | * | 6/1997 | Kawaguchi | 172/21 |
| 6,089,298 | A | * | 7/2000 | Tutewohl | 156/579 |
| 6,286,396 | B1 | * | 9/2001 | Johnson | 81/60 |
| 6,761,201 | B2 | * | 7/2004 | Pelcarsky et al. | 156/579 |
| 2002/0010975 | A1 | * | 1/2002 | Walsh et al. | 15/230.11 |
| 2003/0002946 | A1 | * | 1/2003 | Hsieh | 409/178 |
| 2004/0084864 | A1 | * | 5/2004 | Casey et al. | 280/47.31 |

* cited by examiner

*Primary Examiner* — Richard Crispino
*Assistant Examiner* — Martin Rogers
(74) *Attorney, Agent, or Firm* — James Ray & Assoc

(57) ABSTRACT

A hand tool for closing splices and correcting flaws arising during tire fabrication includes an elongated body member having a butt end, a front end, a top, and at least one side at a substantially right angle to the top; and a handle member is disposed at the butt end of the body member. An arm is fixedly attached to the handle or an interior side of the elongated body member and a metal wheel is rotatably attached to a protruding portion of this arm. A gripping knob is disposed atop the front end of the elongated body member for enabling downward pressure on the wheel.

6 Claims, 3 Drawing Sheets

TIRE SIDEWALL STITCHER

FIELD OF THE INVENTION

The present invention relates, in general, to tools for fabricating rubber tires and, more particularly, this invention relates to a hand tool for leveraging a user's force in sealing an open sidewall splice.

BACKGROUND OF THE INVENTION

Rubber tire fabrication has and still does entail some amount of manual work and inspection. The carcass of the tire is built up before tread and sidewall rubber encases it. Segments of reinforced elastomeric material for the interior plies are eventually placed on a forming drum and joined along adjacent edges. The joining is sometimes called "stitching". As described by Harsel in U.S. Pat. No. 1,319,333, "stitchers", as used in the tire-making art, include rotatable wheels or disks to properly lay the plies of a tire carcass. Harsel disclosed a dual-wheel stitcher as an improvement over the single-disk type common at that time. Moscovita disclosed in U.S. Pat. No. 3,909,341 a dual-wheel splicing hand tool for tire building that included a heating mechanism. Schlemmer in U.S. Pat. No. 4,454,000 discloses a motorized tool for joining self-adhesive plies. These aforementioned hand tools did not come with any features to aid applying downward pressure. Also, they pertain to initial construction of tire foundations, and not to repairing flaws discovered subsequently.

SUMMARY OF THE INVENTION

A hand tool for closing splices and correcting flaws arising during tire fabrication includes an elongated body member having a butt end, a front end, a top piece, and at least one side at a substantially right angle to the top piece; and a handle member is disposed at the butt end of the body member. An arm is fixedly attached to an interior side of the elongated body member and a metal wheel is rotatably attached to a protruding portion of this arm. A gripping knob is disposed atop the front end of the elongated body member for enabling downward pressure on the wheel.

In one alternative embodiment, the wheel is attached rotatably to an arm that engages with the handle member. In another alternative embodiment, the handle member is perpendicular to the axis of the elongated body member.

OBJECTS OF THE INVENTION

It is, therefore, one of the primary objects of the present invention to provide a convenient hand tool for workers involved with correcting flaws and closing splices during tire fabrication.

Another object of the present invention is to minimize downgrades of tires by enabling faster and more effective sealing of an open sidewall splice.

Still another object of the present invention is to provide a tire working tool that exerts ample pressure at the target area with relatively moderate force applied by the user.

Yet another object of the present invention is to minimize hand and wrist injuries or ailments related to closing splices and correction of tire flaws.

An additional object of the present invention is to provide a hand tool for tire fabrication that can be used to close and seal both tread and wire belt splices.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
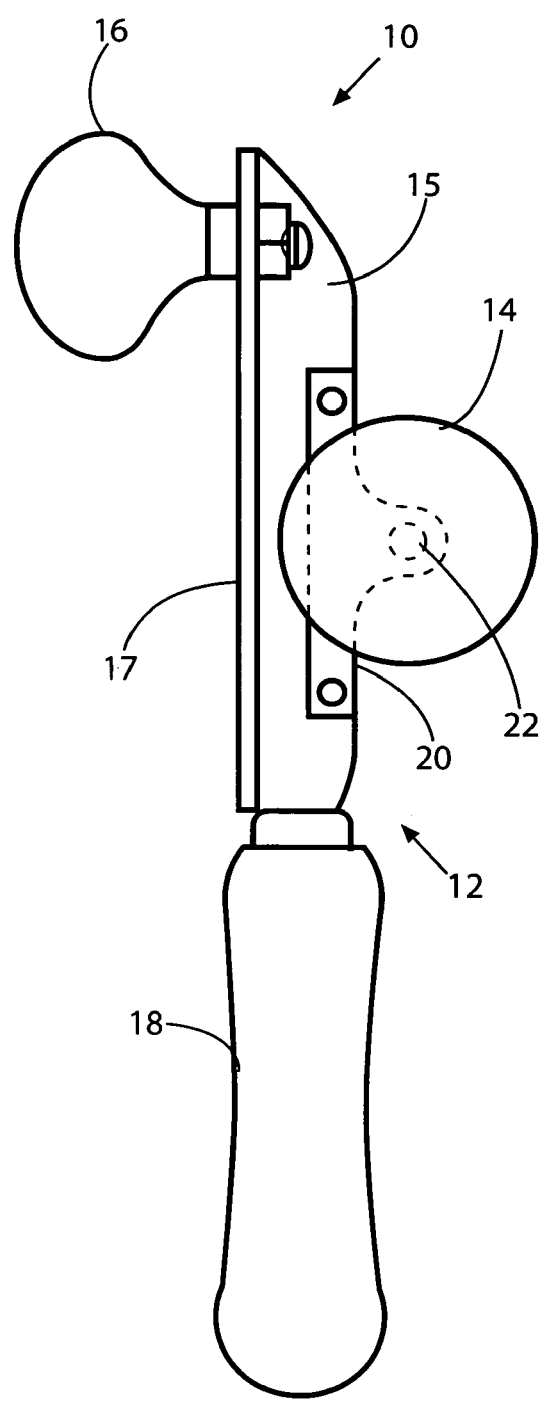
FIG. 1 is a side view of the tool of the present invention

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Referring initially to FIG. 1, the tool 10 is shown in a side view. The main body 12 is fabricated from about a three to six inch long piece of angle iron with approximately a one-inch wide top 17 and a one-inch wide side 15. The angle iron can be altered to a customized shape. A handle 18 is fixed to the butt end of the main body 12, and a knob 16 is attached perpendicular to the top piece 17 near the front end. An arm 20 extends downward below the edge of the main body 12 from the underside of the main body 12, and a wheel or disk 14 is rotatably attached to the arm 20 with a rivet 22. This wheel or disk will typically be about two to three inches in diameter and extend beyond the side. The periphery of wheel 14 will typically be roughened or even have small spikes for good gripping of the target surface. The user holds the handle 18 with one hand while the other pushes down and forward on knob 16 to exert substantial pressure as the wheel 14 rolls along the seam to be "stitched". The splice being sealed can be either in the wire belt or the tread.

Figure 2:
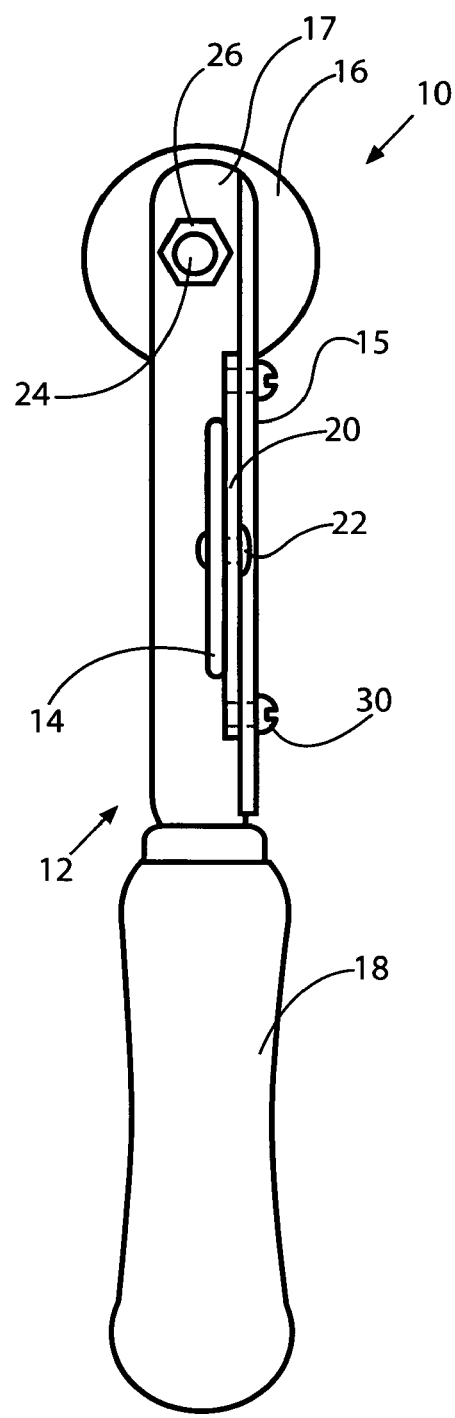
FIG. 2 is a bottom plan view of the present invention.

FIG. 2 provides a plan view of the tool viewed from underneath. There is the L-shaped main body 12 with a handle grip 18 attached at the butt end. A knob 16 is attached via a bolt 24 and a nut 26 to the top piece 17 of main body 12. The arm 20 extends along and beyond the one side 15 of the body 12. A wheel or disk 14 is connected to the arm 20 with a rivet 22 that still permits rotation.

Figure 3:
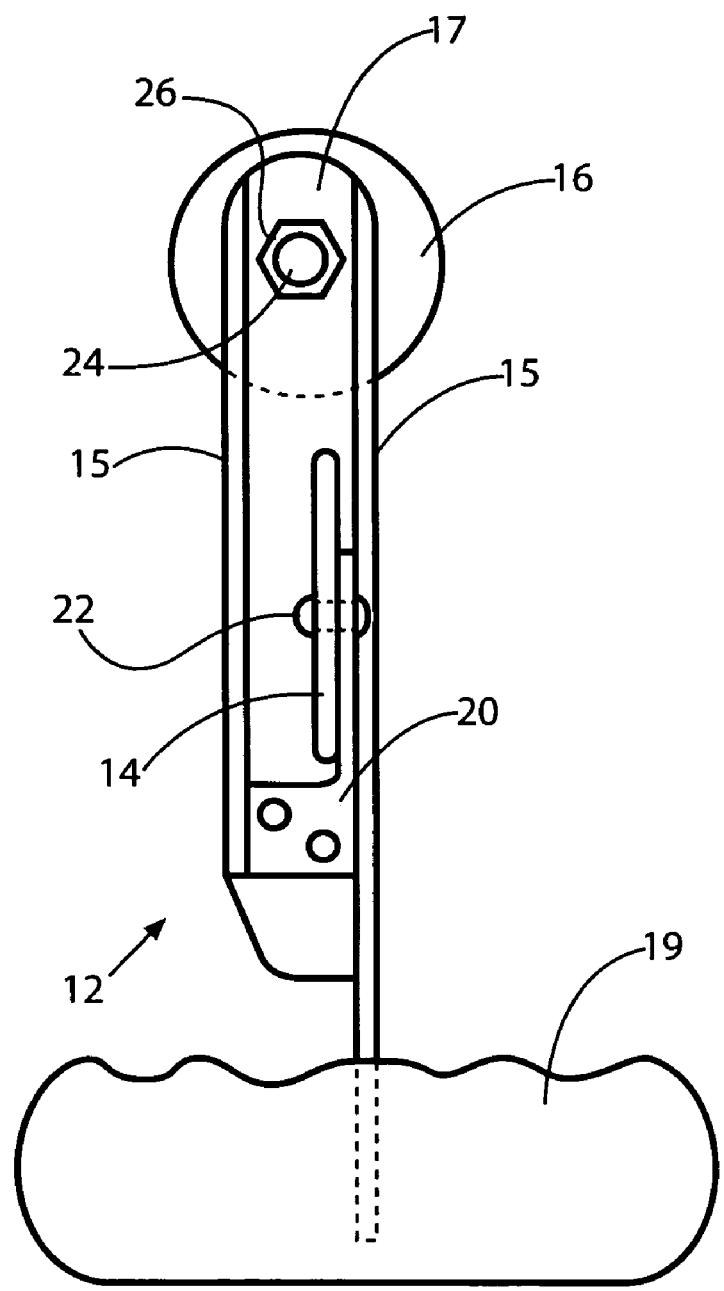
FIG. 3 provides an underside plan view of an alternative embodiment of the present invention.

FIG. 3 provides a bottom side plan view of an alternative embodiment of the present invention. In this variation, the butt-end handle 19 forms a tee-shape with the main body 12. Instead of an angle iron, the main body 12 is a channel with two sides 15. An alternative method of attaching the arm 20 is also depicted. The wheel 14 is rotatably attached to the protruding part of the arm 20 with a rivet or bolt 22. A knob 16 is attached via a bolt 24 and a nut 26 to the top side 17 of the main body 12.

Figure 4:
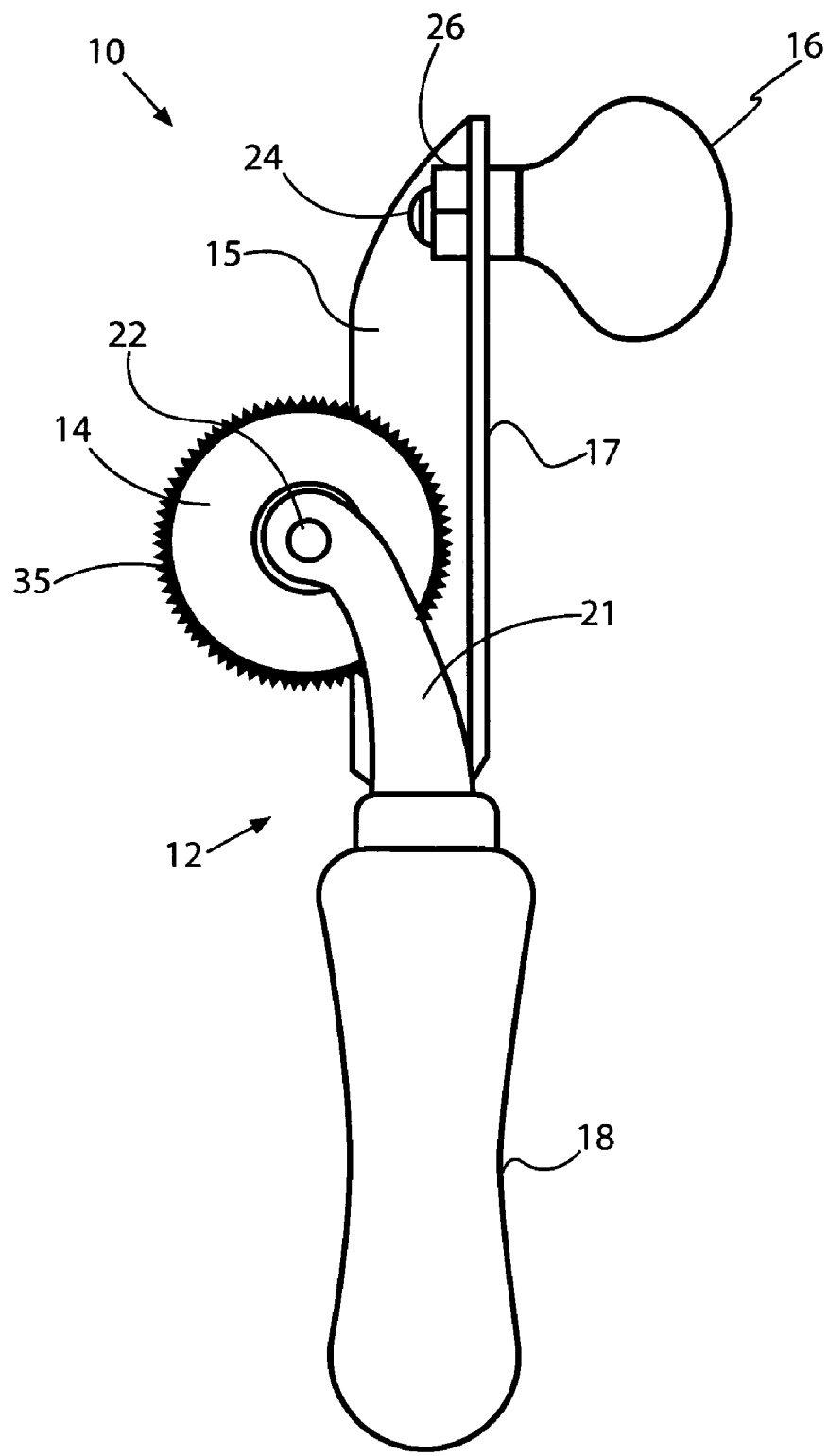
FIG. 4 provides a side elevation view of a preferred embodiment of the present invention.

FIG. 4 is a side elevation view of a preferred embodiment of the present invention. The main body 12 is an angle iron that is fixedly attached to a handle 18. An arcuate arm 21 is also imbedded in the handle 18 and a wheel 14 is fixed to the distal end with a rivet 22 that allows rotation. The periphery of wheel 14 extends partially beyond the side piece 15 and will typically be roughened or even have small spikes or teeth 35 for good gripping of the target surface. A gripping knob 16 is attached to the top 17 adjacent the end distal to the handle 18.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. A hand tool comprising:
   a) a substantially rigid elongated body member having a butt end, a front end, a top portion, and one elongated side at a substantially right angle to said top portion generally defining an L-shaped cross-section in a plane transverse to a length thereof and generally throughout a visible length portion of said elongated body member, said elongated side further having a front end edge thereof tapering inwardly from said top surface;
   b) a handle member disposed at said butt end of said elongated body member;
   c) a substantially planar wheel;
   d) an arm having a first end thereof attached to said handle member, said arm curving in a direction away from said top portion of said substantially rigid elongated body member and further in a direction of said front end thereof, whereby a second end of said arm extends past a bottom edge of said elongated side of said substantially rigid elongated body member, wherein said wheel being rotatably attached to said second end of said arm such that said substantially planar wheel is disposed generally parallel to said elongated side and protrudes at least partially one beyond said bottom edge of said elongated side when the hand tool is in use; and
   e) a gripping means disposed adjacent said front end of said body member and fastened to said top portion, whereby said substantially planar wheel is disposed between said gripping means and said handle member.

2. The hand tool for closing splices and correcting flaws in tire fabrication, according to claim 1, wherein said gripping means adjacent said front end is a knob.

3. The hand tool for closing splices and correcting flaws in tire fabrication, according to claim 1, wherein said handle member is disposed substantially coaxially with said elongated body member.

4. The hand tool for closing splices and correcting flaws in tire fabrication, according to claim 1, wherein said handle member is substantially cylindrical with a resilient covering.

5. The hand tool for closing splices and correcting flaws in tire fabrication, according to claim 1, wherein a periphery of said wheel is one of roughened and spiked.

6. A hand tool comprising:
   (a) an elongated body member having at least a pair of legs defining a generally L-shaped cross-section in a plane transverse to a length thereof and generally throughout a visible length portion of said elongated body member;
   (b) an elongated handle fixed to one end of said elongated body member, said elongated handle disposed generally coaxially with said elongated body member;
   (c) a gripping member fastened to one leg of said elongated body member adjacent to and spaced from an end opposite to said one end having said handle attached thereto;
   (d) a substantially planar disk-shaped member with a roughened or spiked peripheral edge; and (e) means for rotatably securing said disk-shaped member to said elongated handle and further between said gripping means and said elongated handle wherein said means for rotatably securing said disk-shaped member includes an arm having a first end thereof attached to said elongated handle, said arm curving in a direction away from said one leg of said elongated body and further in a direction of a front end thereof, whereby a second end of said arm extends past an edge of another leg of said elongated body member, and wherein said disk-shaped member is rotatably attached to said second end of said arm.

\* \* \* \* \*